S. Riley,
Shovel Plow.
No. 91,164. Patented June 8, 1869.
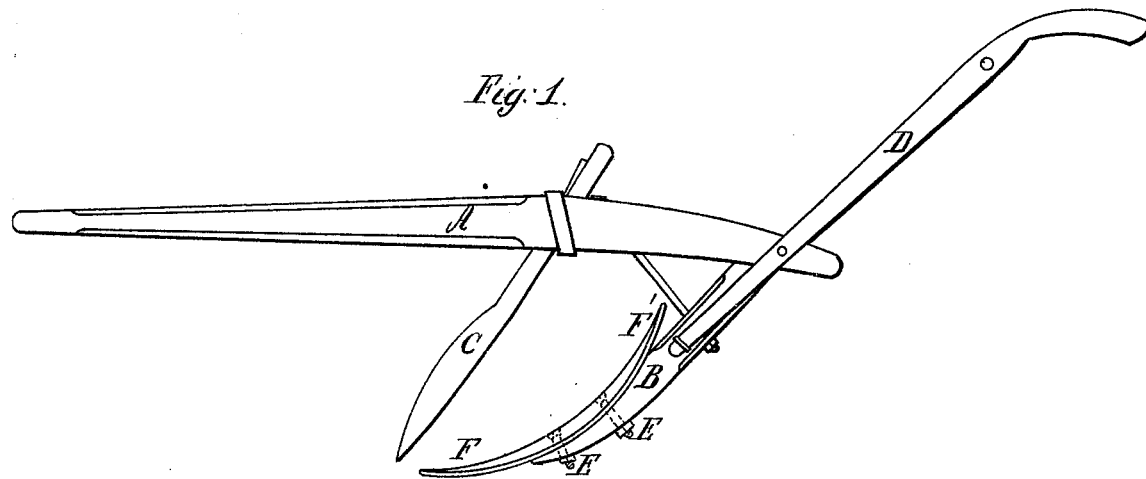
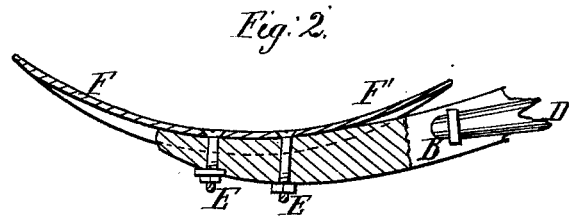
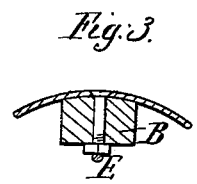
Witnesses:
William Bauer
Sam'l Knight
Inventor:
S. Riley
By Knight & Bro.
Att'ys

United States Patent Office.

SANFORD RILEY, OF NORTHCUTT'S STORE, KENTUCKY.

Letters Patent No. 91,164, dated June 8, 1869.

IMPROVEMENT IN SHOVEL-PLOW.

The Schedule referred to in these Letters Patent and making part of the same.

*To whom it may concern:*

Be it known that I, SANFORD RILEY, of Northcutt's Store, Kenton county, Kentucky, have invented a new and useful Improvement in Shovel-Plows; and I hereby declare the following to be a full, clear, and exact description thereof, reference being had to the accompanying drawings, making part of this specification.

My invention relates to a shovel-plow, whose shovel has a face concave in its longitudinal section, and convex in its transverse section, and which is double-ended, its two ends varying in length, so that by changing the operating-point, not only is the length varied, but also the inclination, in respect to the surface of the ground.

Figure 1 is a side elevation of my plow;

Figure 2 is a longitudinal section of the shovel or share;

Figure 3 is a transverse section of the shovel; and

Figure 4 is a top view of the same.

The beam A, standard B, cutter or coulter C, and stilts D, have the usual form.

Attached to the standard by two bolts, E, is a double-ended and reversible shovel, having ends or points, F F'. The end F is longer than F', and its curve embraces more degrees of a circle than the latter, so that it will be seen that when the said point F is brought into operation, the said point will have a position more nearly approaching the horizontal than that of the point F', when in its operative positions.

The capacity for reversal, operating as above explained, enables the application of the plow to a much greater variety of uses than is the case with common shovel-plows.

For instance, the state of the ground is very various in point of moisture, and as to its earthy constituents, so that no one shovel-plow is calculated to run well under the different circumstances. This difficulty is in a great measure overcome by the reversibility of the shovel.

Again, it is usual to break up newly-cleared woodsland, with what is called a jumping shovel-plow, and in this case the shovel requires to be set much more vertically than in other cases, to enable it at once to penetrate the ground after having been thrown up by the coulter in passing over a root.

When one end of the shovel is formed suitably for a jumping shovel-plow, and the other has the usual set, the plow may obviously be used for either purpose, that is, for the plowing of old or new ground.

The form of the shovel is shown figs. 2, 3, and 4, and it will be seen to be concave in the face from point to point, (see fig. 2,) and convex from edge to edge, (see fig. 3.)

This form I have found to insure great steadiness, and to turn the ground with ease to the team.

I am aware that cultivator-shares have been made reversible, but in those instances the ends have been similar, and the share has only been made reversible, as a means of prolonging its use, the unworn point being brought into service when the other has been worn out.

I claim herein as new, and of my invention—

The combined arrangement of the reversible shovel having diverse ends, F F', and a working-face concave in its length, from point to point, and convex in its width, from side to side, with a plurality of bolts E E, for securing it to its standard, B, as and for the purpose described.

In testimony of which invention, I hereunto set my hand.

SANFORD RILEY.

Witnesses:
G. H. KNIGHT,
JOHN ELLIS.